United States Patent [19]

Florek et al.

[11] Patent Number: 5,182,609
[45] Date of Patent: Jan. 26, 1993

[54] SPECTROMETER

[75] Inventors: Stefan Florek; Reiner Güther; Helmut Becker-Ross, all of Berlin, Fed. Rep. of Germany

[73] Assignee: Zentralinstitut für Optik und Spektroskopie, Berlin-Adlershof, Fed. Rep. of Germany

[21] Appl. No.: 690,729

[22] Filed: Apr. 24, 1991

[30] Foreign Application Priority Data

Apr. 27, 1990 [DE] Fed. Rep. of Germany ......... 340209

[51] Int. Cl.$^5$ ............................................. G01J 3/28
[52] U.S. Cl. ................................................. 356/328
[58] Field of Search ...................... 356/305, 328, 334

[56] References Cited

U.S. PATENT DOCUMENTS

| | | | |
|---|---|---|---|
| 3,625,615 | 12/1971 | Wilson | 356/328 |
| 4,568,187 | 2/1986 | Kita et al. | 356/328 |
| 4,997,281 | 3/1991 | Stark | 356/328 |

FOREIGN PATENT DOCUMENTS

| | | |
|---|---|---|
| 2656119 | 6/1977 | Fed. Rep. of Germany . |
| 2829802 | 1/1979 | Fed. Rep. of Germany . |
| 251837 | 11/1987 | Fed. Rep. of Germany . |
| 1358538 | 3/1986 | U.S.S.R. . |

OTHER PUBLICATIONS

Adar et al, "Raman Scattering, Luminescence, and Spectroscopic Instrumentation in Technology," SPIE Proceedings, Jan. 17–19, 1989, vol. 1055.
*Imaging Properties of Diffraction Gratings*, Wilhelmus Werner, 1970.

*Primary Examiner*—F. L. Evans
*Assistant Examiner*—K. P. Hantis
*Attorney, Agent, or Firm*—Schweitzer Cornman & Gross

[57] ABSTRACT

The invention relates to a spectrometer useful in analytical spectroscopy. The spectrometer has an imaging diffraction grating, a planar receiver system, and an element for flattening the image field, wherein the improvement comprises that a body of low refractive power and perceptible secondary spectrum is used as the element for flattening the image field, said body having at least two optically active surfaces, and is disposed between the entry slit and the diffraction grating.

4 Claims, 3 Drawing Sheets

SPECTROMETER

FIELD OF THE INVENTION

The present invention relates to a spectrometer useful in analytical spectroscopy.

BACKGROUND OF THE INVENTION

Important basic types of monochromators, in which only one color of a spectrum is masked out, and polychromators in which entire spectral ranges are recorded simultaneously with the aid of large-area receivers, such as photographic plates or receiver arrays, are described in J. A. Samson, "Techniques of Vacuum Ultraviolet Spectroscopy" New York, Wiley 1967, or also in W. Werner, "Imaging Properties of Diffraction Gratings" Thesis, Uitgeverij Waltman, Delft, 1970.

In monochromator systems it is known that a large-area planar or curved receiver can stand at the location of the exit slot. An entire spectrum can be projected onto that receiver in the same manner as in the case of a polychromator. Such an apparatus is, for example, the polychromator described in German Patent No. 2,829,802 (G 01 J, 3/18), in which another part of the spectrum appears on a planar receiving line if an appropriately corrected holographic concave grating, which throws an image of the entry slot on this receiving line, is rotated about a vertex. Other polychromators based on concave gratings are disclosed, for example, in German Patent No. 2,656,119 (G 01 J, 3/18), East German Patent No. 251,837 (G 02 B, 5/32), U.S. Pat. No. 4,568,187 (G 01 J, 3/20), and European Patent No. 156,232 (G 01 J, 3/18).

In Soviet Patent No. 1,358,538 (G 01 J, 3/18) there is disclosed a spectrograph based on a corrected holographic concave grating in the immediate surroundings of the Rowland circle, in which the curved spectrum developing in the vicinity of the Rowland circle is adapted to a planar receiver by using an image field flattening lens.

All of the methods used heretofore are either corrected with low resolution on a flattened image field, or are aligned with higher resolution on a curved image field. A curved image field, however, is not adapted to the flat receiver line that is technologically easy to make. The image field flattening lens described in Soviet Patent No. 1,358,538, set close in front of the receiver, has the disadvantage that it is illuminated at an angle in well corrected grating arrangements, and thus leads to slanting beam aberrations with the technologically necessary lens thickness. Furthermore, the flattening lens directly in front of the receiver line produces an increase in the stray and false light content within the spectrum.

DESCRIPTION OF THE INVENTION

It is the object of the present invention to provide an arrangement for a spectrometer in which a flattening of the image field is produced without the occurrence of slanting beam aberrations. Furthermore, any increase in the stray and false light content within the spectrum is to be prevented.

This purpose is achieved in accordance with the present invention, in a spectrometer having an entry slit, an imaging diffraction grating, a planar receiver system, and an image field flattening element, by the improvement that, a body of low refractive power and having a secondary spectrum is provided as the image field flattening element, the body having at least two optically active surfaces and is disposed between the entry slit and the grating. The body can either be a meniscus of negligible spherical error, or a plane-parallel plate.

According to another embodiment of the invention this body is imaged on the side facing away from the grating, as a planar surface bearing the entry slit.

The invention is based on the fact that if an optical transmission element with dispersion is used, focused light shows different focal lengths for different colors in the direction of propagation.

If the index of refraction has a portion that depends quadratically on the wavelength, then a parabola in space is described by the focal curve, through the resulting quadratic variation of focal length with wavelength. If the imaging is appropriately selected, then the curvature of this parabola can be used to compensate the image field curvature which is created by imaging with a concave imaging grating.

For example, it is known in the case of a glass plate that the focus of a focused beam is shifted depending on the color. It is true that a glass plate has a great aperture error, so that only beams of small aperture should be shifted chromatically with a glass plate.

The teaching of the invention is applicable to all types of spectrometers with a curved image field, such as Czerny-Turner spectrometers, Ebert spectrometers, Littrow spectrometers and concave grating spectrometers, for example, in a Wadsworth or Rowland grating arrangement.

BRIEF DESCRIPTION OF THE DRAWING

A suitable embodiment of the invention is described with reference being had to the drawing, wherein the FIG. 1 shows the arrangement of a spectrometer in a Rowland grating, with a meniscus.

DETAILED DESCRIPTION OF THE INVENTION

Lines are created on the concave surface 2 of a concave grating holder 1. The diameter of the Rowland circle 3 for the grating is equal to the radius of curvature R of the grating surface. The grating vertex 4 is at the origin of the X-Y coordinate system in the plane of symmetry of the system.

Figure 1:
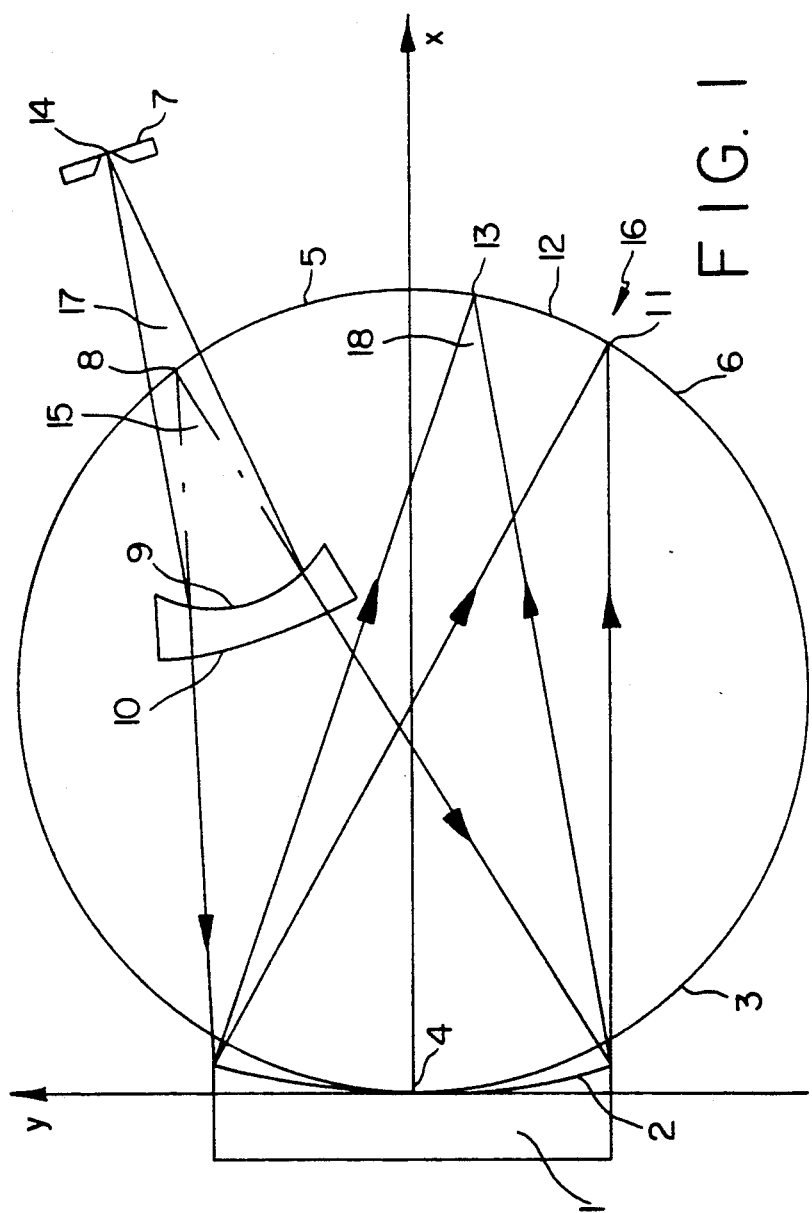
Figure 2:
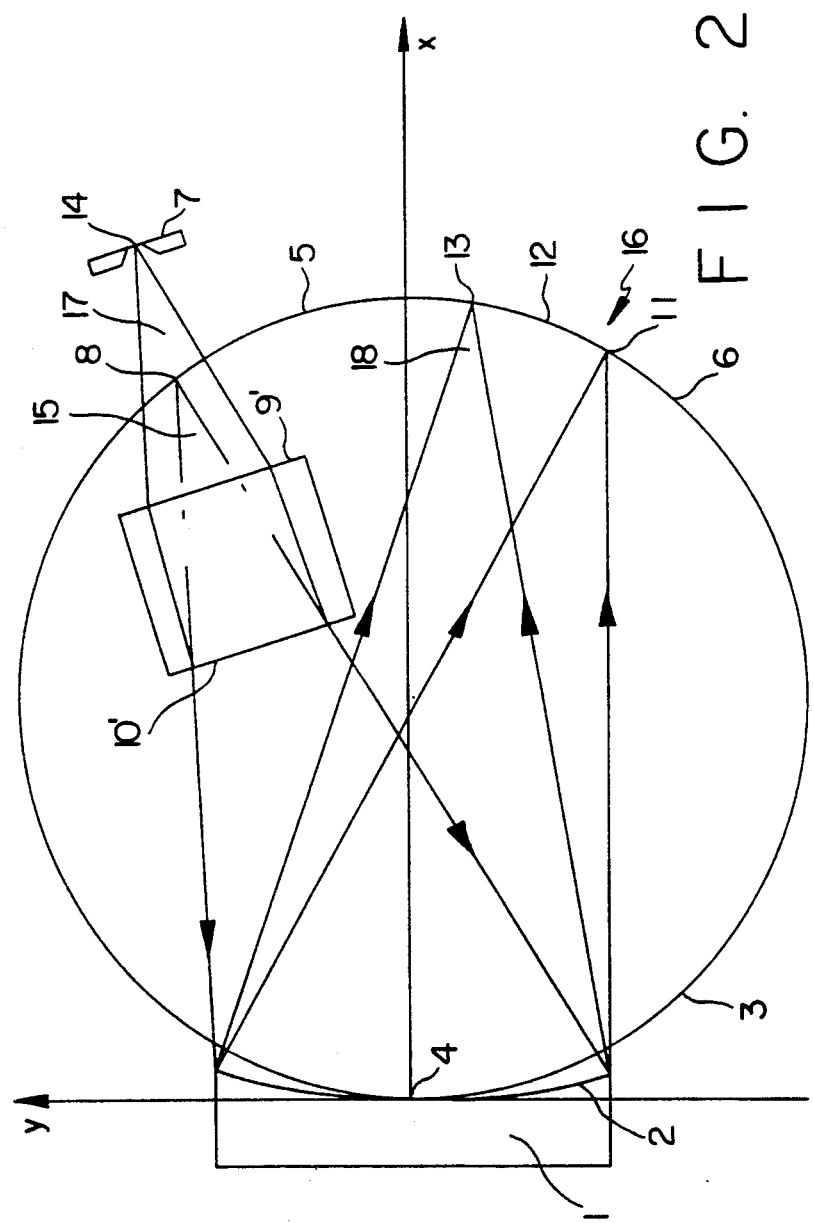
FIG. 2 shows the same, but with plane parallel plate.
Figure 3:
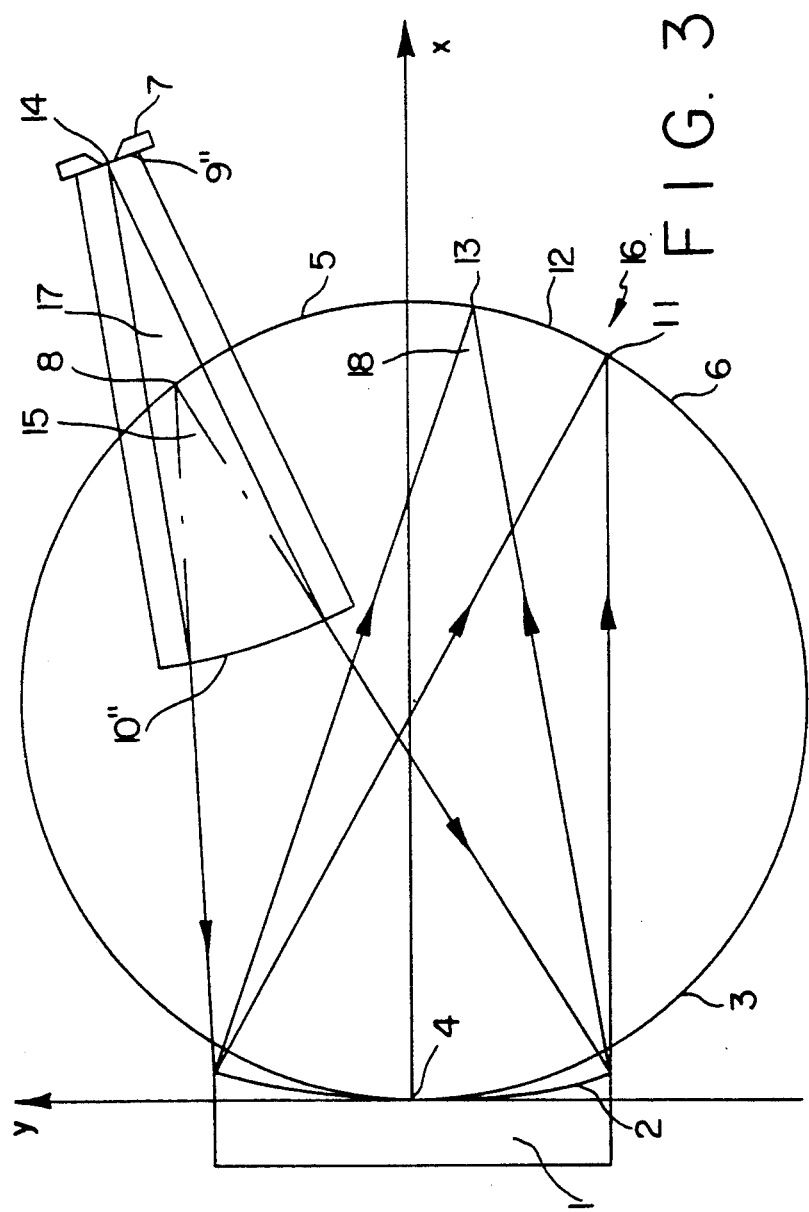
FIG. 3 shows the same, but with an entry slit.

The grating is prepared by drawing the interference field which is produced by the two point light sources 5 with polar coordinates ($J_C$,) in the X-Y coordinate system, and 6 with polar coordinates ($J_D$,) in the X-Y coordinate system. The two light sources 5 and 6 do not have to lie on the Rowland circle 3. But if they do lie on it, the entry slit 7 can be imaged at point 8 on the Rowland circle with the polar coordinates ($1_A$, $a$) in the X-Y coordinate system, on the arc of the Rowland circle containing the spectrum from 11 through 12 to 13, first without the meniscus 9, 10 of FIG. 1, or the plane parallel plate of 9', 10' of FIG. 2, or the entry slit 9", 10" of FIG. 3, in accordance with the invention. With the meniscus in accordance with the invention, which is defined by the surface 9 with the radius of curvature $r-r$ and by the radius or curvature $r+r$, and which acts as a dispersing lens for the beam, the slit need not be disposed in the original position 8 but at the position 14 shifted outwardly by $2(n-1)r$, wherein n is the index of refraction for the middle wavelength contained in the spectrum. Then, for example, the divergent beam running from the meniscus to the grating appears again to come from the virtual light source 8 and the image for the center wavelength would again meet the Rowland circle at 12. At the short wavelength end of the spectrum the index of refraction is increased by $n_{short}$, the meniscus has a greater scattering effect, and the virtual light source is at 1b. The distance between 8 and 15 is reckoned as $$\left(4 - \frac{2}{n}\right) \cdot n_{short} \cdot r.$$

Thus the image 16 from 15 misses the Rowland circle and is shifted outward by the distance 11;

$$16 - \alpha \left(4 - \frac{2}{n}\right) \cdot n_{short} \cdot r.$$

Likewise, for the long-wavelength end of the refractive index variation $n_{long}(<)$ is responsible for the shift of the virtual image from 8 toward 17 by the distance $$\left(4 - \frac{2}{n}\right) \cdot n_{long} \cdot r,$$

resulting in a shift of the image by the distance 13;

$$18 = \alpha \left(4 - \frac{2}{n}\right) \cdot n_{long} \cdot r,$$

where $\alpha$ is the measure of the imaging depth.

Since the chord of the Rowland circle from 11 to 13 represents the length 1 of the receiving line, the height $h_m$ of the circular segment of the chord 11 to 13 can be calculated up to point 12 by $$h_m = \frac{R}{2} - R^2 - \frac{l^2}{2}$$

with R as the radius of curvature of the grating surface.

If now a flattening of the image field is to occur, the points 16, 12 and 18 must lie on a straight line. From this results the requirement 13; $18 + h_m = 11$; $16 - h_m$, from which the radial difference 2 r for the meniscus can be calculated for given R, 1, n, $n_{short}$, $n_{long}$ (from the dispersion curve of the lens material).

In the case of meniscus thicknesses less than 10 mm and conventional glasses of $n \approx 1.5$ for $r \leq 6$ mm at an aperture of 1:2, with the aperture error to be added to the line width of the grating is less than 2 μm, which in view of the magnitude of common receiving lines can be completely tolerated.

The principle here explained on the basis of a Rowland circle is also applicable to general holographic concave grating configurations. Then the light sources 5 and 6 are not located on the Rowland circle. Then, in the above explanation, the term, "Rowland circle" should be replaced by the term, "meridional focal curve." Furthermore, the meridional focal curve of common holographic gratings also shows areas in which the focal curve is convex as seen from the grating vertex 4.

In the case of a normal dispersion curve of the meniscus material, a collecting meniscus should be used.

The principle of the present invention is also applicable to polychromators with mechanically produced imaging gratings.

In a suitable embodiment of the system of the present invention the grating is prepared by means of the two light sources 5 and 6 with the polar coordinates $(1_C,) = (146.38$ mm; $12.62°)$, and $(1D, \delta) = (149.19$ mm; $5.97°)$.

The polychromatic light source is at 14, whose virtual image 8 has the polar coordinates $(1A, \alpha) = (149.65$ mm; $-3.90°)$ for the middle wavelength 375 nm of the spectral range reaching from 250 nm to 500 nm. For the middle wavelength the polar coordinates of image point 12 $(1_B, \beta) = (148.02$ mm; $9.31°)$. The preparative configuration is so designed that the sagittal focal curve touches the Rowland circle as a tangent at point 12. The radius of the grating holder is $R = 150$ mm. The distance from point 8 to the surface 9 is 58 mm, the radius of curvature of the surface 9 is 52.1 mm, the thickness of the meniscus is 2 mm. The radius of the surface 10 is suitably 65.9 mm. The distance between the virtual slit image 8 and the actual position of the entry slit 14 is suitably 5.61 mm.

The inclination of the receiver along the straight line 18; 12; 16 against the sagittal focal curve tangential to the Rowland circle at 12 is 0.068 radian. The resolution is 0.6 nm throughout the entire spectral range.

We claim:

1. A spectrometer having an entry slit, an imaging diffraction grating, a planar receiver system, and an element for flattening the image field, wherein the improvement comprises that a body of low refractive power and having a secondary spectrum is used as the element for flattening the image field, said body having at least two optically active surfaces, and is disposed between the entry slit and the diffraction grating.

2. The spectrometer of claim 1, wherein said body is configured as a meniscus with negligible spherical error.

3. The spectrometer of claim 1, wherein said body is a plane-parallel plate.

4. The spectrometer of claim 1, wherein said body is configured on the side facing away from the grating as a planar surface which bears the entry slit.

* * * * *